(12) United States Patent
Teragawa

(10) Patent No.: US 9,958,590 B2
(45) Date of Patent: May 1, 2018

(54) LIGHT SOURCE DEVICE AND DISPLAY APPARATUS

(71) Applicant: Sakai Display Products Corporation, Sakai-shi, Osaka (JP)

(72) Inventor: Daisuke Teragawa, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days. days.

(21) Appl. No.: 15/310,414

(22) PCT Filed: Jul. 18, 2014

(86) PCT No.: PCT/JP2014/069228
§ 371 (c)(1),
(2) Date: Nov. 10, 2016

(87) PCT Pub. No.: WO2016/009561
PCT Pub. Date: Jan. 21, 2016

(65) Prior Publication Data
US 2017/0261676 A1    Sep. 14, 2017

(51) Int. Cl.
*F21V 7/04* (2006.01)
*F21V 8/00* (2006.01)

(52) U.S. Cl.
CPC ......... *G02B 6/0031* (2013.01); *G02B 6/0068* (2013.01); *G02B 6/0073* (2013.01); *G02B 6/0083* (2013.01)

(58) Field of Classification Search
CPC .. G02B 6/0031; G02B 6/0083; G02B 6/0068; G02B 6/0073
See application file for complete search history.

(56) References Cited

U.S. PATENT DOCUMENTS

| | | | |
|---|---|---|---|
| 2004/0218390 A1* | 11/2004 | Holman | G02B 5/045 362/245 |
| 2006/0098458 A1* | 5/2006 | Mikami | G02B 6/0018 362/632 |
| 2006/0203513 A1* | 9/2006 | Aoki | G02B 6/0021 362/612 |

(Continued)

FOREIGN PATENT DOCUMENTS

| | | |
|---|---|---|
| CN | 104170105 A | 11/2014 |
| EP | 2273570 A1 | 1/2011 |

(Continued)

*Primary Examiner* — Donald Raleigh
(74) *Attorney, Agent, or Firm* — Bret E. Field; Bozicevic, Field & Francis LLP

(57) ABSTRACT

Provided are: a light source device which can reduce the amount of light that escapes from a light-entering surface of a light guide plate in an edge light-type light source device, and which can maintain high display quality; and a display device employing the light source device. The light source device comprises a light guide plate having a rectangular shape, and a substrate having a strip shape on which light emitting diodes are mounted on a surface that faces a side surface of the light guide plate. A plurality of peripheral walls are provided on the substrate so as to enclose at least one of the light emitting diodes. Each of the plurality of peripheral walls has a light reflective inner surface and has a height equal to or greater than the facing distance between the light guide plate and the substrate.

21 Claims, 16 Drawing Sheets

(56) References Cited

U.S. PATENT DOCUMENTS

| | | | |
|---|---|---|---|
| 2008/0088763 A1 | 4/2008 | Toriyama et al. | |
| 2008/0180972 A1 | 7/2008 | Sakamoto et al. | |
| 2012/0056229 A1* | 3/2012 | Hsu | H01L 33/486 257/98 |
| 2014/0016314 A1* | 1/2014 | Woodgate | F21K 9/00 362/235 |
| 2015/0043245 A1 | 2/2015 | Katoh et al. | |
| 2015/0285985 A1* | 10/2015 | Shin | G02B 6/0073 362/97.1 |

FOREIGN PATENT DOCUMENTS

| | | | | |
|---|---|---|---|---|
| JP | 2008-089944 A | | 4/2008 | |
| JP | 2008-186780 A | | 8/2008 | |
| JP | 2012069645 A | * | 4/2012 | H01L 33/54 |

\* cited by examiner

F I G. 1
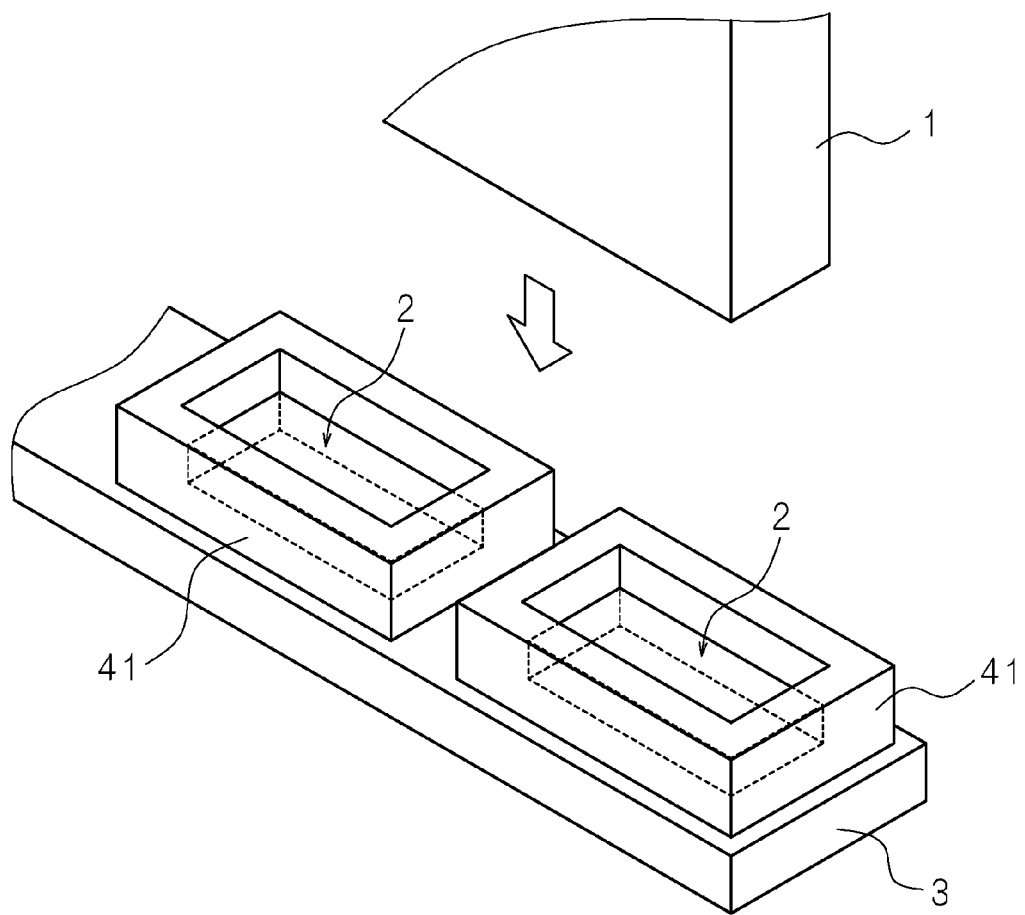

F I G. 9
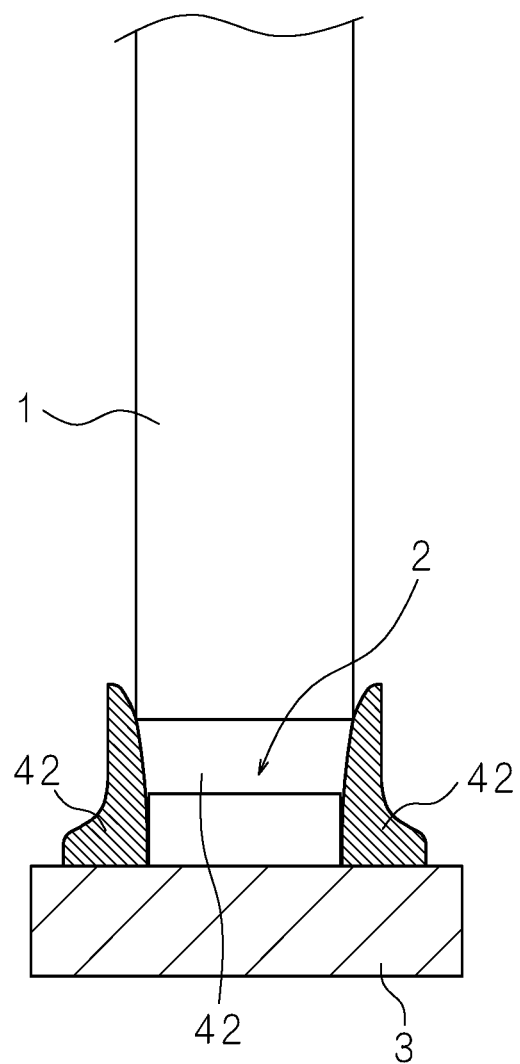

F I G. 1 2
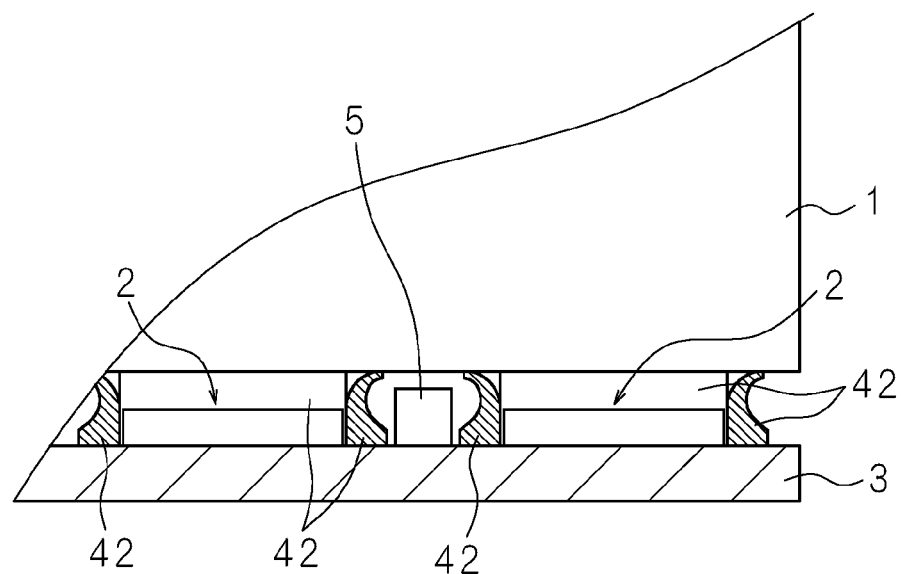

LIGHT SOURCE DEVICE AND DISPLAY APPARATUS

This application is the national phase under 35 U.S.C. § 371 of PCT International Application No. PCT/JP2014/069228 which has an International filing date of Jul. 18, 2014 and designated the United States of America.

BACKGROUND OF THE INVENTION

1. Field of the Invention

The present invention relates to a display apparatus employing a liquid crystal panel, and to a light source device capable of maintaining high display quality and a display apparatus including the light source device.

2. Description of Related Art

In the recent display apparatuses employing a liquid crystal panel, edge light type light source devices are commonly used for thinning the display apparatus. The edge light type light source device is configured such that light emitting diodes are disposed to face one or more side faces of a light guide plate whose one broad surface faces the liquid crystal panel at a prescribed interval. Thereby light emitted from the light emitting diodes progresses from the side surface into the light guide plate, and the liquid crystal panel is uniformly irradiated with the light from the one broad surface of the light guide plate.

The light emitting diodes employed in the edge light type light source device have a structure called a surface mounted type, and are configured by disposing light emitting diode elements and a wiring group such as electrodes on a bottom surface of a deep-dish shaped housing body on which a reflection member is arranged on an inner surface, and filling jelly-like fluorescent bodies in the housing body. The light emitting diode elements and the wiring group are connected to each other by loosened wires, and are adapted so as not to affect emittance even if a positional shift occurs between the respective members due to a difference in heat expansion rates of the respective members such as the housing body, the light emitting diode elements, and the electrodes.

Since the light from the light emitting diodes is radially emitted from surfaces of the fluorescent bodies, there appears a luminous flux which is deviated toward the both broad surfaces while not entering into the side face of the light guide plate (hereinafter referred to as a light-entering surface). As a distance between the surfaces of the fluorescent bodies and the light-entering surface of the light guide plate is increased, loss of light is increased. Therefore, in terms of an incident efficiency to the light guide plate, it is preferable to have a configuration in which the surfaces of the fluorescent bodies and the light-entering surface of the light guide plate are as close to each other as possible. However, when vibrations or impacts are applied to the light source device itself, or when the light guide plate is thermally expanded due to heat of the light emitting diode elements, the light guide plate may contact the housing body. If a force from the light guide plate is applied to the housing body, the housing body itself is distorted. Since the jelly-like fluorescent bodies filled in the housing body become a state liable to be easily loosened by heat generated from the light emitting diode elements, if the housing body itself is distorted, the fluorescent bodies move within the housing body to apply a force to a portion at which the wire may be loosened, and a possibility of causing operation failure of the light emitting diodes such as a disconnection of the wire is increased.

In a conventional light source device of edge light type, in order to prevent a contact between the light guide plate and the light emitting diodes as described above, a configuration, in which a spacer is disposed between the light guide plate and the substrate on which the light emitting diodes are mounted, is employed. In particular, it is suggested that a configuration in which the spacer is provided so as to enclose light emitting diodes, thereby further reliably preventing the contact of the light guide plate with the light emitting diodes.

SUMMARY OF THE INVENTION

In the conventional light source device of edge light type, the spacer provided between the light guide plate and the light emitting diodes has a gap with the light guide plate so as to have a margin for an expanded portion of the light guide plate, in consideration of thermal expansion thereof. Thereby, even if the vibrations or impacts are applied thereto, it is possible to prevent contact of the light-entering surface of the light guide plate with the light emitting diodes by supporting the light guide plate by a reception surface, without preventing thermal expansion of the light guide plate.

However, as the gap is provided between the spacer and the light guide plate, there appears a luminous flux which is deviated from the light-entering surface of the light guide plate among light from the light emitting diodes.

In addition, due to positioning accuracy when assembling the light emitting diodes with respect to the light guide plate, or annual change, a difference in a size of the gap between the light guide plate and the spacer may occur at a first end and a second end opposite to the first end in a longitudinal direction of the light guide plate. In this case, amounts of light deviated from the light-entering surface of the light guide plate are different from each other at the first end and the second end in the longitudinal direction due to the gap, whereby problems such as ununiformity of light irradiated from the light source device to the liquid crystal panel and an insufficient amount of light may occur.

The present invention is made in view of the above-described problems, and an object is to provide a light source device capable of maintaining good display quality by reducing an amount of light deviated from a light-entering surface of a light guide plate in an edge light type light source device, and a display apparatus including the light source device.

A light source device according to one embodiment of the present invention, comprises: a light guide plate having a rectangular shape; a plate provided with a plurality of light emitting diodes on a surface facing a side face of the light guide plate; and a plurality of peripheral walls provided on the plate, each of the plurality of walls enclosing at least one of the plurality of light emitting diodes, having a tubular shape, having an inner surface made of a light reflective elastic body, and having a height being equal to or longer than a distance between the light guide plate and the substrate.

In the light source device according to the embodiment of the present invention, each of the plurality of peripheral walls has a distal part thinner than a proximal part thereof, and the distal part is bent outward.

In the light source device according to the embodiment of the present invention, the inner surface of each of the plurality of peripheral walls includes portions which face each other in a thickness direction of the light guide plate, and each of the portions makes contact with an edge of the light guide plate at a region proximal to the plurality of light emitting diodes.

In the light source device according to the embodiment of the present invention, a plurality of additional peripheral walls are arranged on the plate, wherein each of the plurality of additional peripheral walls is arranged at an inside of each of the plurality of peripheral walls, has a light reflective inner surface, is harder than the plurality of peripheral walls, and has a height lower than that of the plurality of peripheral walls, but higher than that of the plurality of light emitting diodes.

In the light source device according to the embodiment of the present invention, each of the plurality of additional peripheral walls is integrally formed with a housing body which houses elements forming fluorescent bodies and each of the plurality of light emitting diodes.

In the light source device according to the embodiment of the present invention, a groove is formed between the housing body and each of the plurality of additional peripheral walls.

In the light source device according to the embodiment of the present invention, at least an inner surface of each of the plurality of additional peripheral walls is white or a mirror surface.

In the light source device according to the embodiment of the present invention, each of the plurality of peripheral walls is made of silicone rubber.

In the light source device according to the embodiment of the present invention, a spacer is provided between the plurality of light emitting diodes on the plate, and the spacer is harder than that of the plurality of peripheral walls, and has a height higher than that of the light emitting diodes, but lower than the plurality of peripheral walls.

A display apparatus according to one embodiment comprises a liquid crystal panel and any one of the embodiments of the light source device.

According to the embodiment of the present invention, the substrate on which light emitting diodes are mounted includes a multiple peripheral walls. The each peripheral wall has a height or more of a facing distance between a light-entering surface of the light guide plate and the substrate, which is provided so as to enclose at least one of the light emitting diodes. At least the inner surface of the peripheral wall has light reflecting properties, such that light emitted by the light emitting diodes is entered into the light guide plate from the light-entering surface thereof. In addition, since the peripheral wall is made of the elastic body, thermal expansion of the light guide plate is not prevented by the peripheral wall.

Further, the peripheral wall may be a simple configuration such as a polygonal tubular shape, or a cylindrical shape, in which a thickness from a proximal part to a distal part is not changed. In this case, a height of the peripheral wall and a hardness of a material used in the peripheral wall may be appropriately designed, so that, if the peripheral wall is most greatly contracted in a height direction, surfaces of the fluorescent bodies of the light emitting diodes inside thereof are not higher than the peripheral wall.

According to the embodiment of the present invention, it is preferable that the peripheral wall is thinned from the proximal part to the distal part thereof closer to the light-entering surface of the light guide plate, and the distal part is formed in a shape bent outward (a curved shape). Thereby, it is possible to prevent light shielding due to falling of the peripheral wall onto the light emitting diodes by receiving a force from the light guide plate.

According to the embodiment of the present invention, two inner surfaces of the peripheral wall, which face each other, respectively abut the edges of the light guide plate so as to clamp the light guide plate in the thickness direction. Further, it is not necessary for the peripheral wall to support the light guide plate.

According to the embodiment of the present invention, additional peripheral wall harder than the peripheral wall is provided at an inner periphery of the peripheral wall. Thereby, falling of the peripheral wall toward an inside thereof is prevented. In addition, the height of the additional peripheral wall is lower than that of the peripheral wall, but is higher than that of the light emitting diode. Further, the hardness of the additional peripheral wall is harder than that of the peripheral wall. Thereby, even if the thermally expanded light guide plate pushes down the peripheral wall, it is possible to receive the force from the light guide plate by the additional peripheral wall, and prevent the light guide plate from contacting with the light emitting diodes. In addition, for each of the light emitting diodes, the additional peripheral wall exerting a function of a spacer having a slightly higher height is provided, such that it is possible for the light guide plate to be closer to the light emitting diodes as a whole, than a configuration in which the spacers are provided between the light emitting diodes.

According to the embodiment of the present invention, the additional peripheral wall provided at the inner periphery of the peripheral wall is also used as the housing body which houses the elements of the light emitting diodes and the fluorescent bodies, and may be integrally molded therewith.

According to the embodiment of the present invention, in the case that integrally forming the additional peripheral wall with the housing body, a groove having the substantially same depth as the depth of the housing body may be provided between a portion corresponding to the additional peripheral wall and a portion corresponding to the housing body. Thereby, even if a force is applied from the light guide plate to the additional peripheral wall integrally formed with the housing body, the force from the light guide plate is absorbed by a deformation of the portion corresponding to the additional peripheral wall, and the force applied to the housing body is alleviated.

According to the embodiment of to the present invention, the inner surface of the additional peripheral wall, or the entirety including the inner surface is made of a material having light reflecting properties such as a white color material or a mirror surface material. Light emitted from surfaces of the fluorescent bodies is reflected by the inner surface of the additional peripheral wall to be efficiently guided to the light-entering surface of the light guide plate.

According to the embodiment of the present invention, it is preferable that the peripheral wall or the additional wall is made of a highly elastic material such as silicone rubber having some degree of stiffness. Even when configuring in such a manner that the light-entering surface of the light guide plate does not contact the light emitting diodes only by the contraction of the peripheral wall, by using the material having stiffness, it is possible to prevent the peripheral wall from being fallen to the light emitting diode.

According to the embodiment of the present invention, the peripheral wall may be used in combination with spacers respectively provided between the plurality of light emitting diodes, which has been employed in the conventional light source device. Further, a material harder than the peripheral wall is used in the spacer, and the height of the spacer is higher than that of the light emitting diode, but is lower than that of the peripheral wall. Thereby, it is possible to more reliably prevent the contact of the light guide plate with the light emitting diodes.

According to the embodiment of the present invention, it is possible to prevent the light guide plate from contacting with the light emitting diodes, as well as, reduce an amount of light deviated from the light-entering surface of the light guide plate, and maintain high display quality in the display apparatus employing the light guide plate.

BRIEF DESCRIPTION OF THE DRAWINGS

FIG. 1 is a schematic perspective view illustrating by enlarging a part of a light source device according to Embodiment 1.

FIG. 9 is a longitudinal-sectional view taken on line B-B' of FIG. 8.

FIG. 12 is a schematic longitudinal-sectional view of a part of a light source device according to Modified Example 3 of Embodiment 2.

DESCRIPTION OF THE PREFERRED EMBODIMENTS

Figure 2:
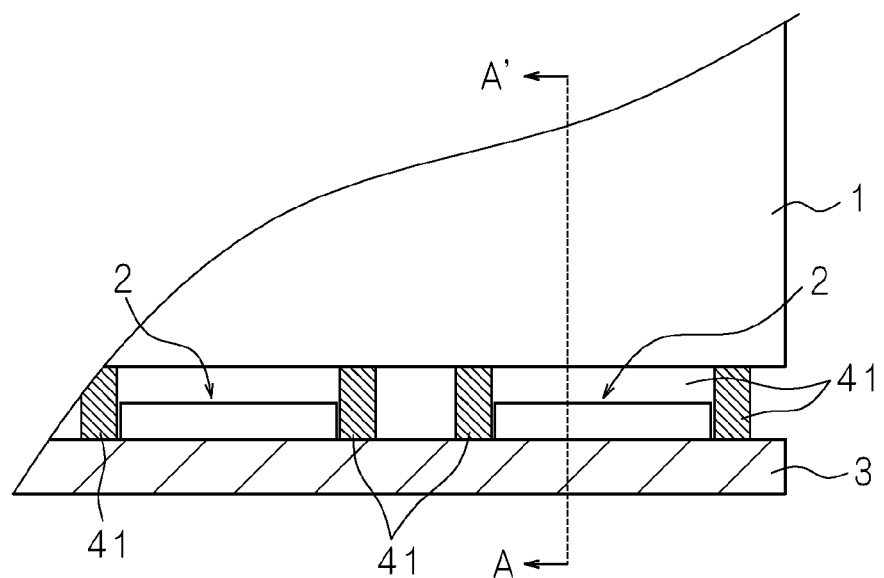
FIG. 2 is a schematic cross-sectional view of a part of the light source device according to Embodiment 1.

Hereinafter, the present invention will be described in detail with reference to the accompanying drawings illustrating embodiments thereof, which however shall not be construed as limiting the scope of the invention thereto because the following Embodiments are mere examples.

Embodiment 1

FIG. 1 is a schematic perspective view illustrating by enlarging a part of a light source device according to Embodiment 1. The light source device includes a light guide plate 1, light emitting diodes 2 and a substrate 3.

The light guide plate 1 is a transparent plate made of an acrylic resin having a rectangular shape. The light guide plate 1 has a thickness of, for example, 3 to 5 mm.

The light emitting diode 2 is a package in which diode elements emitting a blue color or ultraviolet, fluorescent bodies covering on surfaces of the elements, and a housing body for housing these parts are packaged. An outer shape of the light emitting diode 2 is a flat rectangular parallelepiped, and a length in a shorter side direction of the outer shape is slightly smaller than a thickness of the light guide plate 1.

The substrate 3 is a plate having a strip shape, and a width thereof is slightly wider than the thickness of the light guide plate 1. Multiple light emitting diodes 2 are mounted on one surface of the substrate 3 by arranging at a substantially equal interval so that the longer side direction of the light emitting diodes 2 is laid along the longer side direction of the substrate 3, and further have a circuit formed therein to control lighting of these light emitting diodes 2.

Peripheral walls 41 are provided on the substrate 3, and enclose at least one of the light emitting diodes 2 arranged in the longer side direction of the substrate 3. The peripheral wall 41 in Embodiment 1 is a rectangular tube, and one end face thereof is adhered to the substrate 3. A distance between facing surfaces in the shorter side direction of the inside of the peripheral wall 41 is smaller than the thickness of the light guide plate 1.

The peripheral wall 41 uses a material having light reflecting properties and high elasticity, and is made of, for example, pure white silicone rubber. Otherwise, an elastic body such as a foaming resin may be used. In addition, it may be configured in such a manner that a member with high light reflecting properties such as a white color or metal is disposed on only the inner surface thereof, rather than purity. Height and hardness of the peripheral wall 41 are designed so as not to be lower than the height of the outer shape of the light emitting diode 2, when the peripheral wall is most greatly contracted in a height direction.

The light source device is configured by disposing the substrate 3 with respect to the light guide plate 1, so that a surface for mounting the light emitting diode 2 faces a side face (light-entering surface) on one long side of the light guide plate 1, and an distal end of the peripheral wall 41 comes into close contact with the side face.

Figure 3:
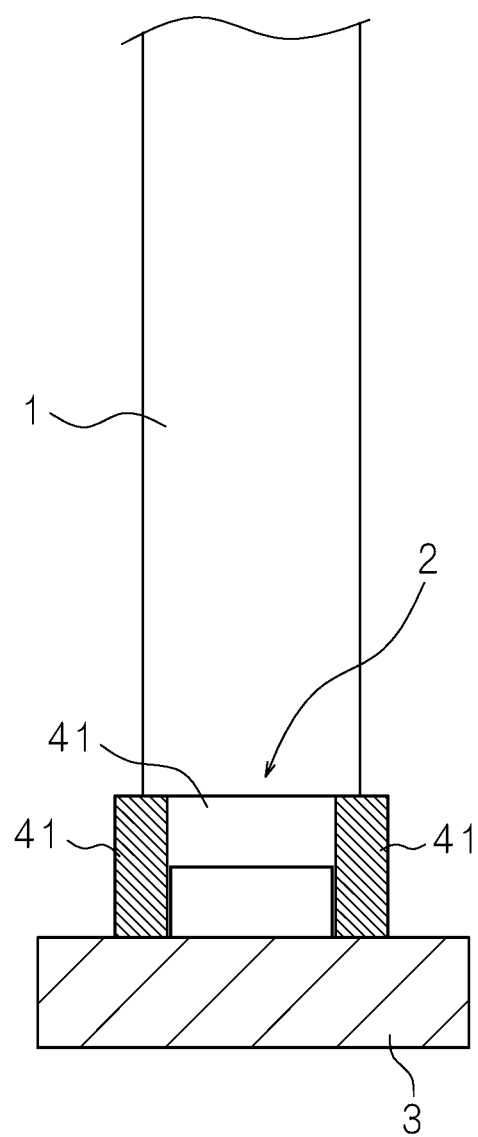
FIG. 3 is a longitudinal-sectional view taken on line A-A' of FIG. 2.

FIG. 2 is a schematic cross-sectional view of a part of the light source device according to Embodiment 1, and FIG. 3 is a longitudinal-sectional view taken on line A-A' of FIG. 2. In the light source device in which the light guide plate 1 is disposed with respect to the substrate 3, the height of the peripheral wall 41 is equal to or slightly larger than a facing distance between the light-entering surface of the light guide plate 1 and the substrate 3. The height and hardness of the peripheral wall 41 are set so that, even if the facing distance between the light guide plate 1 and the substrate 3 is enlarged, a state of contact between an edge surface of the peripheral wall 41 and the light guide plate is maintained. Further, as described above, it is preferential that the height of the peripheral wall 41 is not lower than the height of the outer shape of the light emitting diode 2, if it is most greatly contracted as described above.

As illustrated in Embodiment 1, since the peripheral wall 41 is provided so as to contact the light-entering surface of the light guide plate 1 without a gap, light emitted from the light emitting diodes 2 is entered into the light-entering surface of the light guide plate 1 without leakage. Thereby, it is possible to efficiently maintain a display quality of a display apparatus employing the light source device of Embodiment 1 as a light source with respect to the liquid crystal panel. In addition, since the peripheral wall 41 is flexible, but is designed so that, even if a force from the light guide plate 1 is applied thereto so as to be contracted, the light emitting diode 2 does not protrude from the peripheral wall 41, it is possible to prevent the contact of the light guide plate 1 with the light emitting diode 2, without preventing thermal expansion of the light guide plate 1.

Modified Example 1

Figure 4:
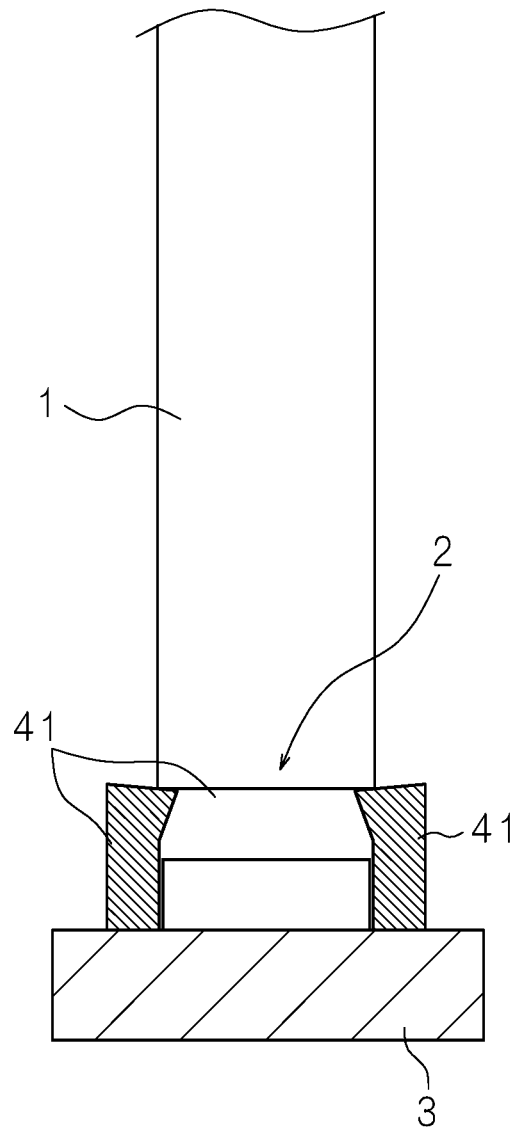
FIG. 4 is a schematic longitudinal-sectional view of a part of a light source device according to Modified Example 1 of Embodiment 1.

FIG. 4 is a schematic longitudinal-sectional view of a part of a light source device according to Modified Example 1 of Embodiment 1. In Modified Example 1, a length in a shorter side direction on the outside of a light emitting diode 2 is substantially the same as the thickness of the light guide plate 1. In order to correspond thereto, a thickness of a peripheral wall 41 in Modified Example 1 is enlarged toward an inside in distal part thereof. Further, the thickness of the peripheral wall 41 may be adapted so as to be enlarged by a deformation of the distal parts thereof. Briefly, a distance between the facing surfaces in the shorter side direction of the inside of the peripheral wall 41 is adapted so as to be substantially the same as the thickness of the light guide plate 1 at a region close to the substrate 3, but be smaller than the thickness of the light guide plate 1 in the distal part. The configuration other than the thickness in the shorter side direction of the peripheral wall 41 is the same as Embodiment 1.

In Modified Example 1, in the case that the height of the peripheral wall 41 is slightly larger than the facing distance between the light-entering surface of the light guide plate 1 and the substrate 3, as illustrated in FIG. 4, the peripheral wall 41 is contracted in the height direction, and distal end thereof are inclined toward an inside thereof. In this case, since the light-entering surface of the light guide plate 1 and the peripheral wall 41 are maintained with being in contact with each other with no gap, light emitted from the light emitting diodes 2 is entered into the light-entering surface of the light guide plate 1 without leakage. Thereby, it is possible to efficiently maintain display quality of a display apparatus employing the light source device of Embodiment 1 as a light source with respect to the liquid crystal panel.

Modified Example 2

Figure 5:
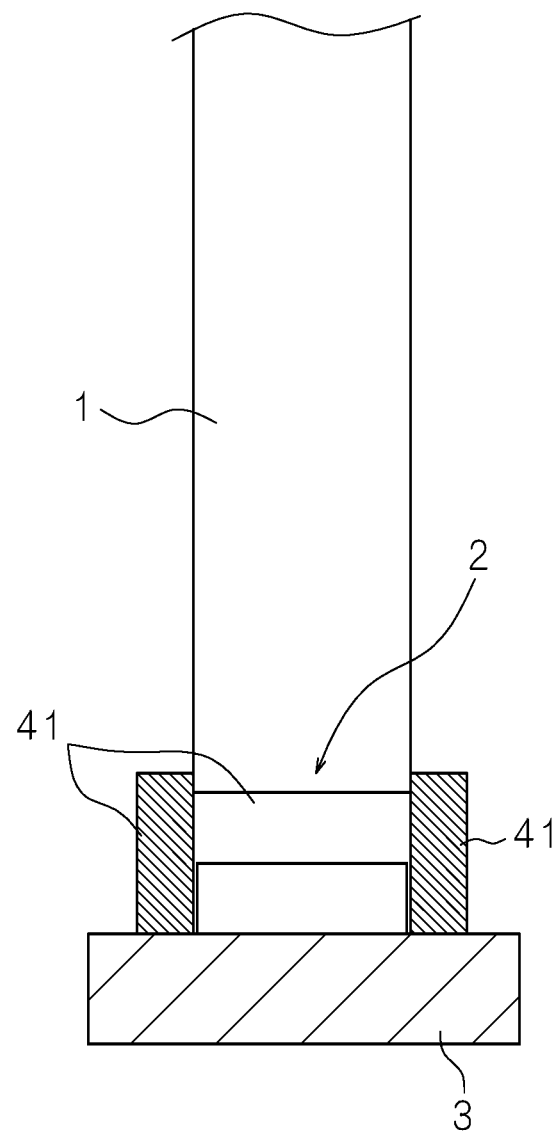
FIG. 5 is a schematic longitudinal-sectional view of a part of a light source device according to Modified Example 2 of Embodiment 1.

FIG. 5 is a schematic longitudinal-sectional view of a part of a light source device according to Modified Example 2 of Embodiment 1. In Modified Example 2, a length in a shorter side direction of on the outside of a light emitting diode 2 is substantially the same as the thickness of the light guide plate 1, and a part along the shorter side direction of the peripheral wall 41 abuts the light-entering surface of the light guide plate 1.

In Modified Example 2, in the case that the height of the peripheral wall 41 is slightly larger than the facing distance between the light-entering surface of the light guide plate 1 and the substrate 3, as illustrated in FIG. 5, only the part of the peripheral wall 41 abutting the light-entering surface of the light guide plate 1 is contracted, and a part along the longer side direction thereof becomes a shape so as to clamp the light guide plate 1 without shrinkage. In this case, since the light-entering surface of the light guide plate 1 and the peripheral wall 41 are maintained with being in contact with each other with no gap, light emitted from the light emitting diodes 2 is entered into the light-entering surface of the light guide plate 1 without leakage. Thereby, it is possible to efficiently maintain display quality of a display apparatus employing the light source device of Embodiment 1 as a light source with respect to the liquid crystal panel.

Modified Example 3

Figure 6:
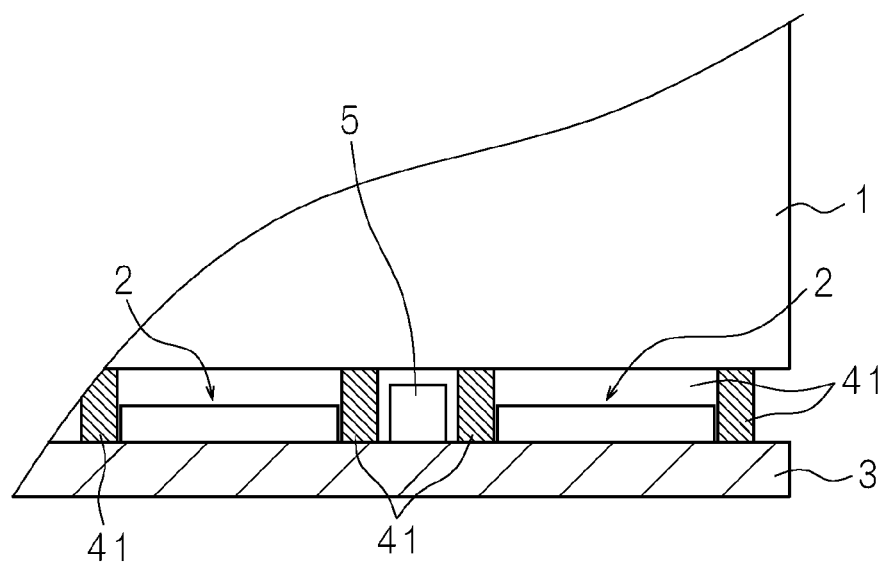
FIG. 6 is a schematic longitudinal-sectional view of a part of a light source device according to Modified Example 3 of Embodiment 1.

FIG. 6 is a schematic longitudinal-sectional view of a part of a light source device according to Modified Example 3 of Embodiment 1. In a substrate 3 as illustrated in FIG. 6, the above-described peripheral walls 41 are provided, and further a spacer 5 is provided at a substantially middle position between the light emitting diodes 2. A height of the spacer 5 is higher than that of the light emitting diode 2, but is lower than that of the peripheral wall 41. A hardness of the spacer 5 is harder than that of the peripheral wall 41.

In Modified Example 3 of Embodiment 1, by respectively providing the spacers 5 which are harder than the peripheral wall 41 between the light emitting diodes 2, if the light guide plate 1 is thermally expanded, a displacement thereof is absorbed by a deformation of the peripheral wall 41, and when the light guide plate 1 is further expanded, the light guide plate 1 abuts the spacers 5. Therefore, it is possible to more reliably prevent the contact of the light guide plate 1 with the light emitting diodes 2.

Embodiment 2

Figure 7:
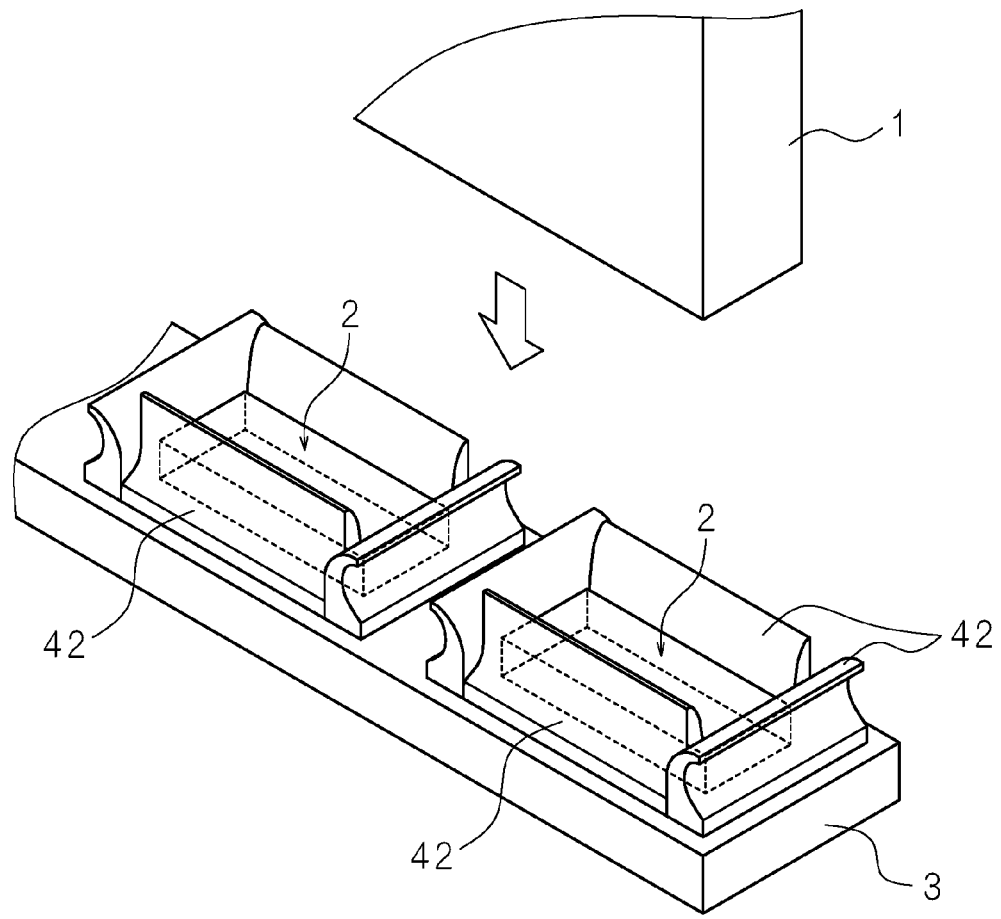
FIG. 7 is a schematic perspective view illustrating by enlarging a part of a light source device according to Embodiment 2.

FIG. 7 is a schematic perspective view illustrating by enlarging a part of a light source device according to Embodiment 2. The light source device according to Embodiment 2 is the same as that of Embodiment 1 other than the configuration of the peripheral wall. Therefore, in the following description, the components having functions common to Embodiment 1 will be denoted by the same reference numerals, and will not be described in detail.

In Embodiment 2, peripheral walls 42 are provided on the substrate 3, and enclose at least one of the light emitting diodes 2 arranged in the longer side direction of the substrate 3. Each of the peripheral walls 42 includes four tongue pieces adhered to the substrate 3 along the respective side walls of the light emitting diode 2. Each tongue piece of the peripheral wall 42 is thinned in a taper shape toward a distal part thereof, and the distal part of each tongue piece is formed in a shape bent outward (a curved shape) from the light emitting diode 2 positioned at the center of the peripheral wall 42.

The peripheral wall 42 uses a material having light reflecting properties and high elasticity, and is made of, for example, pure white silicone rubber. Otherwise, an elastic body such as a foaming resin may be used, but a viscous elastic body having some degree of stiffness is preferably used. In addition, it may be configured in such a manner that a member with high light reflecting properties such as a white color or metal is disposed on only the inner surface thereof, rather than purity.

Figure 8:
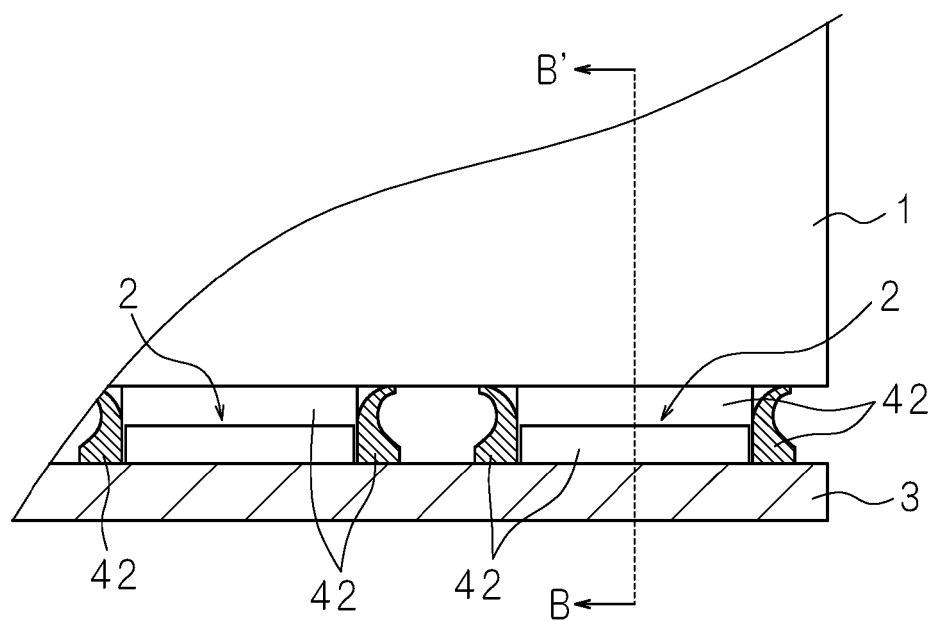
FIG. 8 is a schematic cross-sectional view of a part of the light source device according to Embodiment 2.

FIG. 8 is a schematic cross-sectional view of a part of the light source device according to Embodiment 2, and FIG. 9 is a longitudinal-sectional view taken on line B-B' of FIG. 8. In Embodiment 2, the substrate 3 is disposed with respect to the light guide plate 1, while the surface for mounting the light emitting diode 2 faces the light-entering surface on one long side of the light guide plate 1. In this case, among the four tongue pieces of the peripheral walls 42, two pieces facing in the shorter side direction of the substrate 3 abut the light guide plate 1 so as to clamp them as illustrated in FIG.

9, and two pieces facing each other in the longer side direction of the substrate 3 are adapted so that the distal parts thereof come into close contact with the light-entering surface of the light guide plate 1. A length of each tongue piece of the peripheral wall 42 is larger than the facing distance between the light guide plate 1 and the substrate 3, and among four tongue pieces, two pieces facing each other in the shorter side direction of the substrate 3 protrude closer to the broad surface of the light guide plate 1, respectively. Further, two pieces of the peripheral walls 42 facing each other in the shorter side direction of the substrate 3 do not support the light guide plate 1, and are adapted to simply abut the edges of the light guide plate 1 by the inside thereof.

In the light source device according to Embodiment 2, the peripheral walls 42 are provided so as to fill a large portion of gap between the facing surfaces of the substrate 3 and the light guide plate 1, and a space inside of the peripheral walls 42 is enlarged toward the light guide plate 1. Therefore, most of the light emitted from the light emitting diodes 2 is entered into the light guide plate 1 from the light-entering surface thereof. In addition, since the distal parts of the peripheral walls 42 are formed in a taper shape, and are bent outward from the light emitting diode 2 positioned at the center of the peripheral wall 42, even if the abutting light guide plate 1 is thermally expanded, and is displaced in a direction approaching the light emitting diode 2 to apply a force to the peripheral walls 42, the peripheral walls 42 are much less likely to be fallen to the light emitting diode 2, such that, it is possible to prevent light shielding due to falling of the peripheral walls 42.

As described above, also in Embodiment 2, it is possible to prevent the light guide plate 1 from contacting with the light emitting diode 2, without preventing thermal expansion of the light guide plate 1. Thereby, it is possible to efficiently maintain display quality of a display apparatus employing the light source device of Embodiment 2 as a light source with respect to the liquid crystal panel.

Modified Example 1

Figure 10:
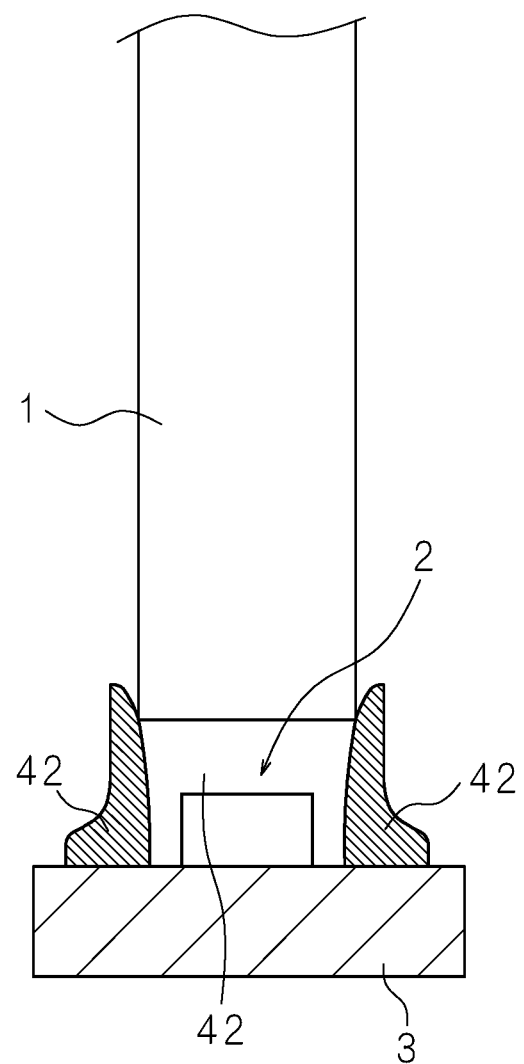
FIG. 10 is a schematic longitudinal-sectional view of a part of a light source device according to Modified Example 1 of Embodiment 2.

FIG. 10 is a schematic longitudinal-sectional view of a part of a light source device according to Modified Example 1 of Embodiment 2. In Modified Example 1, a length in a shorter side direction on the outside of a light emitting diode 2 is smaller than the thickness of the light guide plate 1. In order to correspond thereto, two pieces of the peripheral walls 42 facing each other in the shorter side direction are provided having a gap with respect to side walls of the light emitting diode 2, are provided so that a distance between the facing surfaces of the two pieces is smaller than the thickness of the light guide plate 1, and are adapted so that distal parts of the two pieces abut the light guide plate 1 so as to clamp them. The configurations other than this are the same as those of Embodiment 2.

Also in Modified Example 1, since the light-entering surface of the light guide plate 1 and the peripheral wall 42 are maintained with being in contact with each other with no gap even if the light guide plate 1 is thermally expanded, light emitted from the light emitting diodes 2 is entered into the light guide plate 1 from the light-entering surface thereof, and it is possible to prevent the light guide plate 1 from contacting with the light emitting diode 2, without preventing thermal expansion of the light guide plate 1. Thereby, it is possible to efficiently maintain display quality of a display apparatus employing the light source device of Embodiment 2 as a light source with respect to the liquid crystal panel.

Modified Example 2

Figure 11:
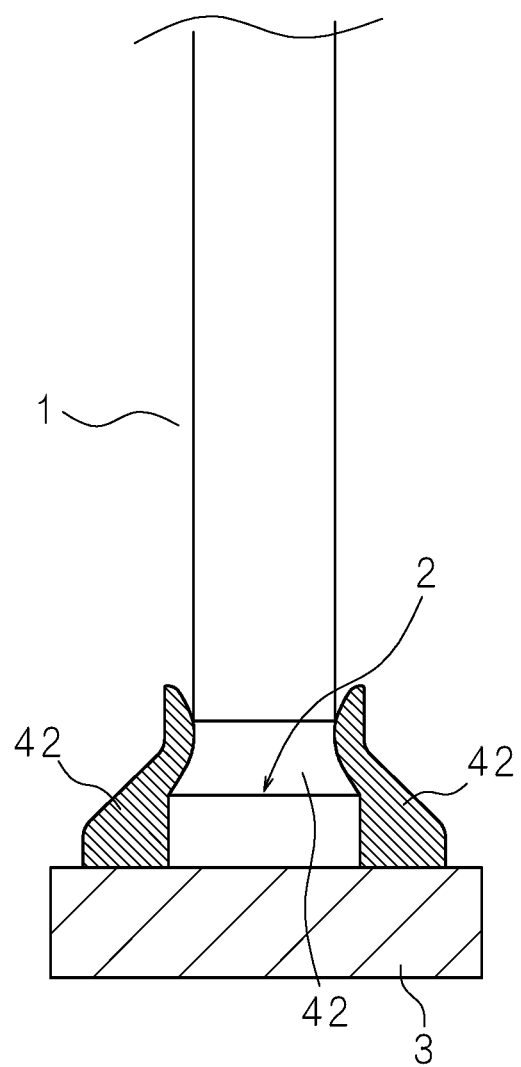
FIG. 11 is a schematic longitudinal-sectional view of a part of a light source device according to Modified Example 2 of Embodiment 2.

FIG. 11 is a schematic longitudinal-sectional view of a part of a light source device according to Modified Example 2 of Embodiment 2. In Modified Example 2, a length in a shorter side direction on the outside of a light emitting diode 2 is larger than the thickness of the light guide plate 1. In order to correspond thereto, a distance between two pieces of the peripheral walls 42 facing each other in the shorter side direction is adapted so as to be decreased toward to the light guide plate 1 as illustrated in FIG. 11, and the two pieces are adapted so that distal parts thereof abut the light guide plate 1 so as to clamp them. The two pieces of the peripheral walls 42 facing each other in the shorter side direction have a cross section of a substantially S shape to face each other.

Also in Modified Example 2, since the light-entering surface of the light guide plate 1 and the peripheral wall 42 are maintained with being in contact with each other with no gap even if the light guide plate 1 is thermally expanded or contracted, light emitted from the light emitting diodes 2 is entered into the light guide plate 1 from the light-entering surface thereof, and it is possible to prevent the light guide plate 1 from contacting with the light emitting diode 2, without preventing thermal expansion of the light guide plate 1. Thereby, it is possible to efficiently maintain display quality of a display apparatus employing the light source device of Embodiment 2 as a light source with respect to the liquid crystal panel.

Modified Example 3

FIG. 12 is a schematic longitudinal-sectional view of a part of a light source device according to Modified Example 3 of Embodiment 2. In a substrate 3 as illustrated in FIG. 12, the above-described peripheral walls 42 are provided, and further a spacer 5 is provided at a substantially middle position between the light emitting diodes 2. A height of the spacer 5 is higher than that of the light emitting diode 2, but is lower than that of the peripheral wall 42. A hardness of the spacer 5 is harder than that of the peripheral wall 42.

In Modified Example 3 of Embodiment 2, by providing the spacers 5 which are harder than the peripheral wall 42 between the light emitting diodes 2, if the light guide plate 1 is thermally expanded, a displacement thereof is absorbed by a deformation of the peripheral walls 42 outward, and if the light guide plate 1 is further expanded, the light guide plate 1 abuts the spacers 5. Therefore, it is possible to more reliably prevent the contact of the light guide plate 1 with the light emitting diodes 2.

Embodiment 3

Figure 13:
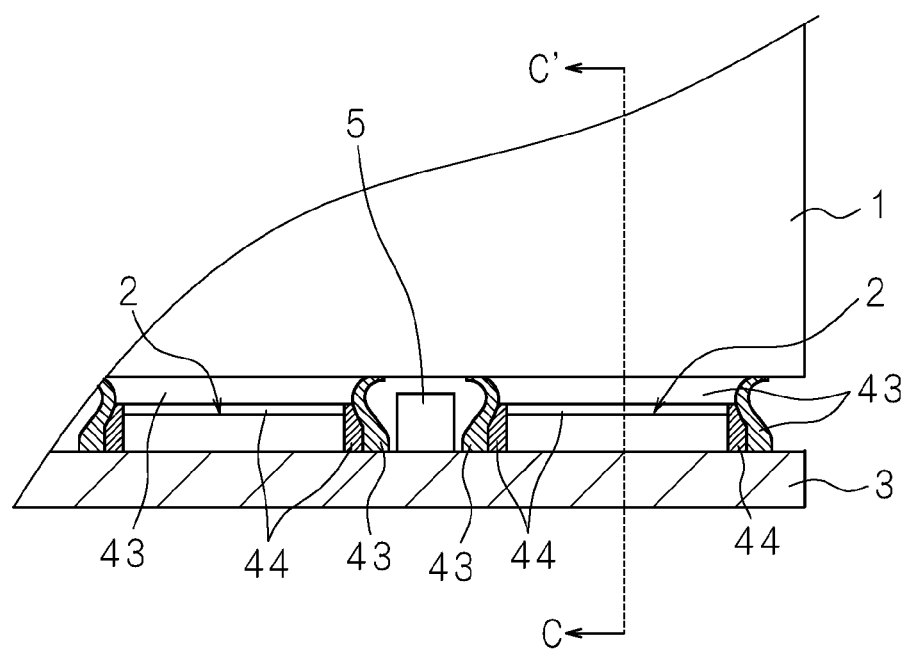
FIG. 13 is a schematic perspective view illustrating a part of a light source device according to Embodiment 3.
Figure 14:
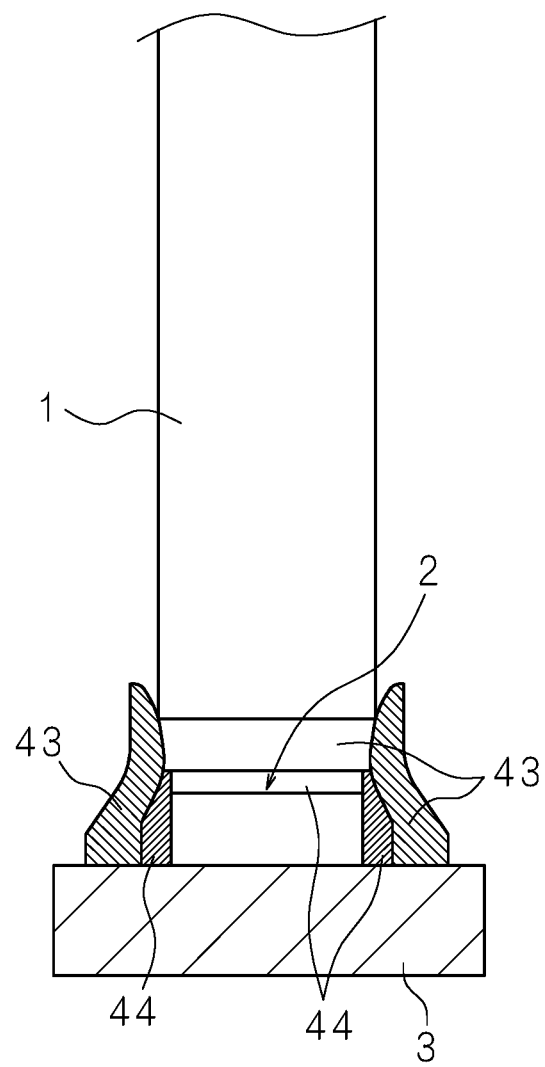
FIG. 14 is a longitudinal-sectional view taken on line C-C' of FIG. 13.

FIG. 13 is a schematic perspective view illustrating a part of a light source device according to Embodiment 3, and FIG. 14 is a longitudinal-sectional view taken on line C-C' of FIG. 13. The light source device according to Embodiment 3 is the same as that of Embodiment 1 other than the configuration of the peripheral wall. Therefore, in the following description, the components having functions common to Embodiment 1 will be denoted by the same reference numerals, and will not be described in detail.

The substrate 3 in Embodiment 3 is provided with first peripheral walls 44 and second peripheral walls 43. The first peripheral wall 44 is formed so as to be laid along the side walls of the light emitting diode 2 arranged thereon, and the second peripheral wall 43 further enclose the first peripheral wall 44. The first peripheral wall 44 is harder than the second peripheral wall 43, and uses a material having light reflecting properties. The first peripheral wall 44 is made of, for example, a resin of a white color or a mirror surface material. The first peripheral wall 44 has a cross section of a rectangular shape with a thickness reduced in a taper shape toward the light guide plate 1. The second peripheral walls 43 include four tongue pieces adhered to the substrate 3 along outer surfaces of the first peripheral walls 44. The second peripheral wall 43 uses a material having light reflecting properties and high elasticity, and is made of, for example, pure white silicone rubber. Further, otherwise, the second peripheral wall 43 may use an elastic body such as a foaming resin, but preferably use a viscous elastic body having some degree of stiffness. Each tongue piece of the second peripheral wall 43 is thinned in a taper shape toward a distal part thereof, and the distal part of each tongue piece is formed in a shape bent outward from the light emitting diode 2 as a center, respectively. A height of the second peripheral wall 43 is higher than that of the first peripheral wall 44. Further, the first peripheral wall 44 and the second peripheral wall 43 may be configured in such a manner that a member with high light reflecting properties such as a white color or metal is disposed on only the inner surface thereof, rather than purity.

In Embodiment 3, the substrate 3 is disposed with respect to the light guide plate 1, while the surface for mounting the light emitting diode 2 faces the side face (light-entering surface) on one long side of the light guide plate 1. In this case, similar to the peripheral wall 42 in Embodiment 2, among the four tongue pieces of the second peripheral wall 43, two pieces facing in the shorter side direction of the substrate 3 abut the light guide plate 1 so as to clamp them as illustrated in FIG. 14, and two pieces facing each other in the longer side direction of the substrate 3 are adapted so that the distal parts thereof come into close contact with the light-entering surface of the light guide plate 1. A length of each tongue piece of the second peripheral wall 43 is larger than the facing distance between the light guide plate 1 and the substrate 3, and among four tongue pieces, two pieces facing each other in the shorter side direction of the substrate 3 protrude closer to the broad surface of the light guide plate 1. Further, two pieces of the second peripheral wall 43 facing each other in the shorter side direction of the substrate 3 do not support the light guide plate 1, and are adapted to simply abut the edges of the light guide plate 1 by the inside thereof.

Figure 15:
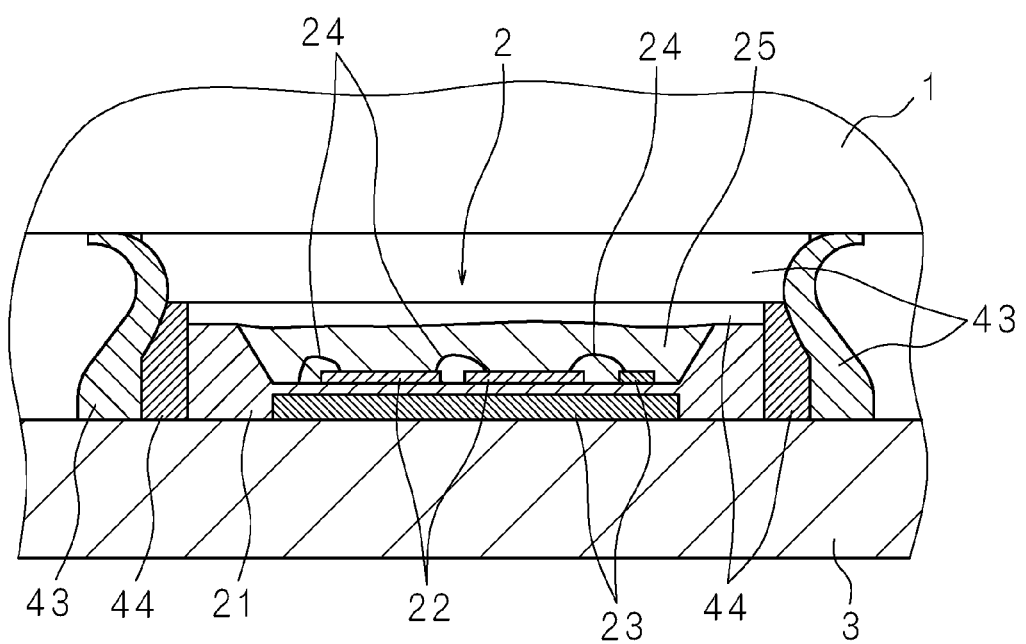
FIG. 15 is an enlarged view of FIG. 13.

FIG. 15 is an enlarged view of FIG. 13. FIG. 15 schematically illustrates an internal structure of the light emitting diode 2 in FIG. 13. The light emitting diode 2 is configured by arranging light emitting elements 22 and wirings 23 on obverse and reverse of a bottom plate of a rectangular deep-dish shaped housing body 21 made of a white resin, connecting the light emitting elements 22 and the wirings 23 with each other by loosened wires 24, and filling jelly-like fluorescent bodies 25 in the housing body 21. The housing body 21 may be provided with a high reflective member such as a metal thin film on an inner surface thereof.

As illustrated in FIG. 15, in Embodiment 3, the first peripheral wall 44 slightly higher than the housing body 21 is disposed between the second peripheral wall 43 and the housing body 21. Thereby, even if the light guide plate 1 is thermally expanded, and is displaced in a direction approaching the light emitting diode 2, the displacement is absorbed by a deformation of the flexible second peripheral wall 43, and if the light guide plate 1 is further expanded, the light guide plate 1 abuts the first peripheral wall 44. Therefore, it is possible to more reliably prevent the contact of the light guide plate 1 with the light emitting diodes 2. Since the deformation of the second peripheral wall 43 occurs with being supported by the harder first peripheral wall 44, the deformed second peripheral wall 43 is not fallen to the light emitting diode 2. Thereby, it is possible to prevent light shielding of the light emitting diode 2 due to falling of the second peripheral wall 43. Further, since the first peripheral wall 44 is provided adjacent to the housing body 21, it is possible to more effectively prevent the light guide plate 1 from contacting with the light emitting diode 2, than a configuration in which the spacers 5 are provided at a substantially middle position between the respective light emitting diodes 2. Therefore, it is possible to dispose the substrate 3 close to the light guide plate 1, and improve the incident efficiency to the light-entering surface of the light guide plate 1. Thereby, it is possible to more efficiently maintain display quality of a display apparatus employing the light source device of Embodiment 3 as a light source with respect to the liquid crystal panel.

Embodiment 4

Figure 16:
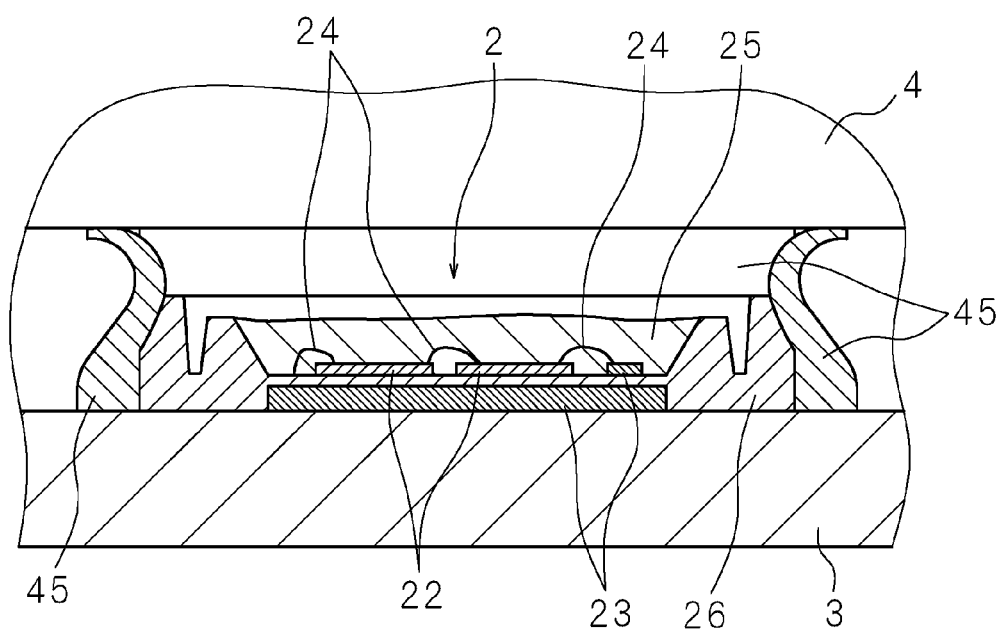
FIG. 16 is a schematic perspective view illustrating by enlarging a part of a light source device according to Embodiment 4.

FIG. 16 is a schematic perspective view illustrating by enlarging a part of a light source device according to Embodiment 4. The light source device according to Embodiment 4 is the same as those of Embodiments 1 and 3 other than the configuration of the peripheral wall. Therefore, in the following description, the components having functions common to Embodiments 1 and 3 will be denoted by the same reference numerals, and will not be described in detail.

In Embodiment 4, the light source device is configured in such a manner that the housing body 21 of the light emitting diode 2 and the first peripheral wall 44 in Embodiment 3 are integrally formed with each other.

The light emitting diode 2 in Embodiment 4 is configured by arranging light emitting elements 22 and wirings 23 on obverse and reverse of a bottom plate of a housing body 26, connecting the light emitting elements 22 and the wirings 23 with each other by loosened wires 24, and filling jelly-like fluorescent bodies 25 in the housing body 26. The housing body 26 is made of a material having high light reflecting properties, and is made of, for example, a white resin. The housing body 26 is a rectangular deep-dish shape, and has an outer side wall which is formed at the outside of the side wall and is slightly higher than the side wall with a groove interposed therebetween. A depth of the groove is substantially the same as the depth of the housing body 26, and the groove is, for example, a trapezoidal groove. The housing body 26 may be configured in such a manner that a member with high light reflecting properties such as a white color or metal is disposed on only the inner surface thereof.

In the light source device according to Embodiment 4, the light emitting diodes 2 including the housing bodies 26 are mounted on the substrate 3 by arranging at a substantially equal interval so that the longer side direction of the light emitting diodes 2 is laid along the longer side direction of the substrate 3. Further, peripheral walls 45 are provided to stand on the substrate 3, the each peripheral wall 45 enclosing the housing body 26 of the light emitting diode.

The peripheral wall 45 uses a material having light reflecting properties and high elasticity, and is made of, for example, pure white silicone rubber. In addition, the peripheral wall 45 is harder than the housing body 26. Otherwise, the peripheral wall 45 may use an elastic body such as a foaming resin, but preferably use a viscous elastic body having some degree of stiffness. Each tongue piece of the peripheral walls 45 is thinned in a taper shape toward a distal part thereof, and the distal part of each tongue piece is formed in a shape bent outward from the light emitting diode 2 as a center. A height of the peripheral wall 45 is higher than that of the housing body 26. Further, the peripheral wall 45 may be configured in such a manner that a member with high light reflecting properties such as a white color or metal is disposed on only the inner surface thereof, rather than purity.

In Embodiment 4, the substrate 3 is disposed with respect to the light guide plate 1, while the surface for mounting the light emitting diode 2 faces the side face (light-entering surface) on one long side of the light guide plate 1. In this case, similar to the peripheral walls 42 in Embodiment 2, among the four tongue pieces of the peripheral wall 45, two pieces facing in the shorter side direction of the substrate 3 abut the light guide plate 1 so as to clamp them, and two pieces facing each other in the longer side direction of the substrate 3 are adapted so that the distal parts thereof come into close contact with the light-entering surface of the light guide plate 1. A length of each tongue piece of the peripheral wall 45 is larger than the facing distance between light-entering surface of the light guide plate 1 and the substrate 3, and among four tongue pieces, two pieces facing each other in the shorter side direction of the substrate 3 protrude toward the broad surface of the light guide plate 1. Further, two pieces of the peripheral wall 45 facing each other in the shorter side direction of the substrate 3 do not support the light guide plate 1, and are adapted to simply abut the edges of the light guide plate 1 by the inside thereof.

In Embodiment 4, even if the light guide plate 1 is thermally expanded, and is displaced in a direction approaching the light emitting diode 2, the displacement is absorbed by a deformation of the flexible peripheral walls 45, and if the light guide plate 1 is further expanded, the light guide plate 1 abuts the outer side wall of the housing body 26. Thereby, it is possible to more reliably prevent the light guide plate 1 from contacting with the light emitting diodes 2. In addition, in Embodiment 4, due to the side wall of the housing body 26 is configured so that the height of the outer surface is slightly higher than that of the inner surface, and the configuration in which the first peripheral wall 44 and the housing body 21 in Embodiment 3 are integrally formed with each other, a prevention of falling of the peripheral wall 45 which enclose the housing body 26 toward the inside thereof may be achieved by reducing the number of parts. Further, in Embodiment 4, by providing the groove between the inner side wall and the outer side wall of the housing body 26, even if a force is applied to the inside at the outer side wall of the housing body 26 toward the inside thereof due to the deformation of the peripheral wall 45, the force may be absorbed by the deformation of the outer side wall, and thereby preventing a deformation of the side wall toward the inside thereof. Also in Embodiment 4, since the light guide plate 1 may be supported by the outer side wall portion of the housing body 26, it is possible to more effectively prevent the light guide plate 1 from contacting with the light emitting diode 2, than the configuration in which the spacers 5 are provided at the substantially middle position between the respective light emitting diodes 2. It is possible to decrease the facing distance between the light-entering surface of the light guide plate 1 and the substrate 3, and improve the incident efficiency to the light-entering surface of the light guide plate 1. Thereby, it is possible to efficiently maintain display quality of a display apparatus employing the light source device of Embodiment 4 as a light source with respect to the liquid crystal panel.

It should be understood that the present embodiment disclosed above is illustrative and not restrictive. The scope is defined by the appended claims rather than by the description preceding them, and all changes that fall within metes and bounds of the claims, or equivalence of such metes and bounds thereof are therefore intended to be embraced by the claims.

The invention claimed is:

1. A light source device comprising:
a light guide plate having a rectangular shape; and
a plate provided with a plurality of light emitting diodes on a surface facing a side face of the light guide plate, further comprising
a plurality of peripheral walls provided on the plate, each of the plurality of peripheral walls enclosing at least one of the plurality of light emitting diodes, having a tubular shape, having an inner surface made of a light reflective elastic body, and having a height being equal to or longer than a distance between the light guide plate and the plate; and
a spacer provided between the plurality of light emitting diodes on the plate, wherein the spacer is harder than the each of the plurality of peripheral walls, and has a height higher than that of the light emitting diodes, but lower than that of the plurality of peripheral walls.

2. The light source device according to claim 1, wherein each of the plurality of peripheral walls encloses each one of the plurality of light emitting diodes.

3. The light source device according to claim 1, wherein each of the plurality of peripheral walls has a distal part thinner than a proximal part thereof, and the distal part is bent outward.

4. The light source device according to claim 1, wherein each of the plurality of peripheral walls is made of silicone rubber.

5. The light source device according to claim 3, wherein the inner surface of each of the plurality of peripheral walls includes portions which face each other in a thickness direction of the light guide plate, and each of the portions makes contact with an edge of the light guide plate at a region proximal to the plurality of light emitting diodes.

6. The light source device according to claim 3, further comprises a plurality of additional peripheral walls, each of the plurality of additional peripheral walls arranged at an inside of each of the plurality of peripheral walls on the plate, wherein
each of the plurality of additional peripheral walls has a light reflective inner surface, is harder than the plurality of peripheral walls, and has a height lower than that of the plurality of peripheral walls, but higher than that of the plurality of light emitting diodes.

7. The light source device according to claim 6, wherein each of the plurality of additional peripheral walls is integrally formed with a housing body which houses elements forming fluorescent bodies and each of the plurality of light emitting diodes.

8. The light source device according to claim 6, wherein at least an inner surface of each of the plurality of additional peripheral walls is white or a mirror surface.

9. The light source device according to claim 6, wherein each of the plurality of additional peripheral walls is made of silicone rubber.

10. The light source device according to claim 7, wherein a groove is formed between the housing body and each of the plurality of additional peripheral walls.

11. A display apparatus comprising:
a liquid crystal panel;
a light guide plate having a rectangular shape; and
a plate provided with a plurality of light emitting diodes on a surface facing a side face of the light guide plate; further comprising
a plurality of peripheral walls provided on the plate, each of the plurality of peripheral walls enclosing at least one of the plurality of light emitting diodes, having a tubular shape, having an inner surface made of a light reflective elastic body, and having a height being equal to or longer than a distance between the light guide plate and the substrate; and
a spacer provided between the plurality of light emitting diodes on the plate, wherein the spacer is harder than the each of the plurality of peripheral walls, and has a height higher than that of the light emitting diodes, but lower than that of the plurality of peripheral walls.

12. A light source device comprising:
a light guide plate having a rectangular shape; and
a plate provided with a plurality of light emitting diodes on a surface facing a side face of the light guide plate, further comprising
a plurality of peripheral walls provided on the plate, each of the plurality of peripheral walls enclosing at least one of the plurality of light emitting diodes, having a tubular shape, having an inner surface made of a light reflective elastic body, and having a height being equal to or longer than a distance between the light guide plate and the plate;
wherein each of the plurality of peripheral walls has a distal part thinner than a proximal part thereof, and the distal part is bent outward and the device further comprises a plurality of additional peripheral walls, each of the plurality of additional peripheral walls arranged at an inside of each of the plurality of peripheral walls on the plate, wherein each of the plurality of additional peripheral walls has a light reflective inner surface, is harder than the plurality of peripheral walls, and has a height lower than that of the plurality of peripheral walls, but higher than that of the plurality of light emitting diodes.

13. The light source device according to claim 12, wherein each of the plurality of peripheral walls encloses each one of the plurality of light emitting diodes.

14. The light source device according to claim 12, wherein each of the plurality of peripheral walls is made of silicone rubber.

15. The light source device according to claim 12, further comprises a spacer provided between the plurality of light emitting diodes on the plate, wherein
the spacer is harder than the each of the plurality of peripheral walls, and has a height higher than that of the light emitting diodes, but lower than that of the plurality of peripheral walls.

16. The light source device according to claim 12, wherein the inner surface of each of the plurality of peripheral walls includes portions which face each other in a thickness direction of the light guide plate, and each of the portions makes contact with an edge of the light guide plate at a region proximal to the plurality of light emitting diodes.

17. The light source device according to claim 12, wherein each of the plurality of additional peripheral walls is integrally formed with a housing body which houses elements forming fluorescent bodies and each of the plurality of light emitting diodes.

18. The light source device according to claim 12, wherein at least an inner surface of each of the plurality of additional peripheral walls is white or a mirror surface.

19. The light source device according to claim 12, wherein each of the plurality of additional peripheral walls is made of silicone rubber.

20. The light source device according to claim 19, wherein a groove is formed between the housing body and each of the plurality of additional peripheral walls.

21. A display apparatus comprising:
a liquid crystal panel;
a light guide plate having a rectangular shape; and
a plate provided with a plurality of light emitting diodes on a surface facing a side face of the light guide plate; further comprising
a plurality of peripheral walls provided on the plate, each of the plurality of peripheral walls enclosing at least one of the plurality of light emitting diodes, having a tubular shape, having an inner surface made of a light reflective elastic body, and having a height being equal to or longer than a distance between the light guide plate and the substrate;
wherein each of the plurality of peripheral walls has a distal part thinner than a proximal part thereof, and the distal part is bent outward and the device further comprises a plurality of additional peripheral walls, each of the plurality of additional peripheral walls arranged at an inside of each of the plurality of peripheral walls on the plate, wherein each of the plurality of additional peripheral walls has a light reflective inner surface, is harder than the plurality of peripheral walls, and has a height lower than that of the plurality of peripheral walls, but higher than that of the plurality of light emitting diodes.

* * * * *